(12) United States Patent
Ottomanelli et al.

(10) Patent No.: US 11,944,083 B2
(45) Date of Patent: Apr. 2, 2024

(54) ROTATING ROD HOLDER

(71) Applicants: Michael J. Ottomanelli, Melbourne Beach, FL (US); Jordan H. Smith, Murphy, TX (US); Charles C. Squires, McKinney, TX (US)

(72) Inventors: Michael J. Ottomanelli, Melbourne Beach, FL (US); Jordan H. Smith, Murphy, TX (US); Charles C. Squires, McKinney, TX (US)

( * ) Notice: Subject to any disclaimer, the term of this patent is extended or adjusted under 35 U.S.C. 154(b) by 0 days.

(21) Appl. No.: 17/497,859

(22) Filed: Oct. 8, 2021

(65) Prior Publication Data
US 2022/0110306 A1 Apr. 14, 2022

Related U.S. Application Data

(60) Provisional application No. 63/089,244, filed on Oct. 8, 2020.

(51) Int. Cl.
| | |
|---|---|
| *A01K 97/10* | (2006.01) |
| *A01K 97/00* | (2006.01) |
| *B63B 17/00* | (2006.01) |
| *A01K 97/08* | (2006.01) |

(52) U.S. Cl.
CPC ............ *A01K 97/10* (2013.01); *A01K 97/00* (2013.01); *B63B 17/00* (2013.01); *A01K 97/08* (2013.01)

(58) Field of Classification Search
CPC ...... A01K 97/10; A01K 97/125; A01K 97/00; A01K 97/12; A01K 97/08; Y10S 224/922; B63B 17/00; F16M 11/18; F16M 11/242

USPC ......................................................... 248/517
See application file for complete search history.

(56) References Cited

U.S. PATENT DOCUMENTS

| | | | |
|---|---|---|---|
| 2,458,881 A | * | 1/1949 | Steuer ................... A01K 97/10 248/514 |
| 3,783,547 A | | 1/1974 | Bystrom et al. |
| 4,097,017 A | | 6/1978 | Hazlitt |
| 4,476,645 A | | 10/1984 | Paarmann |
| 4,495,721 A | | 1/1985 | Emory, Jr. |

(Continued)

OTHER PUBLICATIONS

Taco Marine, Boat Rod Holder; Jul. 27, 2020 Retrieved from: https://www.nauticexpo.com/prod/taco-marine-inc/product-21861-486235.html.

(Continued)

*Primary Examiner* — Nkeisha Smith
(74) *Attorney, Agent, or Firm* — Lowndes; Stephen C. Thomas

(57) ABSTRACT

An apparatus for stowing and/or transporting rod-shaped structures such that the rods are easily insertable into, and removable from, the rod holder when it is located underneath an overhead obstruction that would otherwise prevent insertion or removal of rods into the rod holder. The rod holder rotates away from the receiving structure to which it is attached by operation of a rotatable attachment between the rod holder and a base. The base comprises a latching mechanism to prevent the rod holder from rotating unless it is released using a latch release lever. The rod holder allows insertion of longer rods into the rod holder than would otherwise be possible using rod holders of the prior art. The rod holder increases ease of access to rods stored in the rod holder. An exemplary use case is the storage of fishing rods under a T-top on a fishing boat.

17 Claims, 13 Drawing Sheets

(56) References Cited

U.S. PATENT DOCUMENTS

| | | | |
|---|---|---|---|
| 5,000,210 A * | 3/1991 | Worthington, Jr. | A47C 7/66 135/96 |
| 5,054,737 A * | 10/1991 | DeLancey | A01K 97/10 248/515 |
| 5,070,638 A | 12/1991 | Tregaskis | |
| 5,546,693 A | 8/1996 | Stockton et al. | |
| 5,992,081 A | 11/1999 | Elkins | |
| 6,089,524 A | 7/2000 | Lai | |
| 6,289,627 B1 | 9/2001 | Gibbs et al. | |
| 6,318,018 B1 | 11/2001 | Weaver | |
| 6,381,897 B1 | 5/2002 | Walsh | |
| 6,974,113 B1 * | 12/2005 | Clark | A01K 97/10 248/521 |
| 7,114,281 B2 | 10/2006 | Miller | |
| D574,920 S * | 8/2008 | Marcus | D22/147 |
| 7,774,973 B2 | 8/2010 | Carnevali | |
| 7,849,630 B2 | 12/2010 | Carnevali | |
| 9,220,252 B1 | 12/2015 | Arcabascio | |
| 9,326,496 B2 * | 5/2016 | Chmura | A01K 97/10 |
| 10,258,026 B2 * | 4/2019 | Thomas | F16M 11/2014 |
| 10,856,539 B2 * | 12/2020 | Thomas | A01K 97/10 |
| 11,079,064 B1 * | 8/2021 | Cifers | F16B 2/185 |
| 2005/0172534 A1 | 8/2005 | Arcabascio | |
| 2009/0211141 A1 * | 8/2009 | Marcus | A01K 97/10 43/21.2 |
| 2015/0366180 A1 * | 12/2015 | Chmura | A01K 97/10 248/125.7 |
| 2016/0255823 A1 | 9/2016 | Thomas | |
| 2019/0104714 A1 * | 4/2019 | Serocki | A01K 97/10 |

OTHER PUBLICATIONS

Amazon, Bekith 2 Pack Adjustable Powerlock Rod Holder with Combo Mount, Black Finish : Sports & Outdoor; 2016 Retrieved from: https://www.amazon.com/Bekith-Adjustable-Powerlock-Holder-Finish/dp/B01G3G7KDO.

Amazon, Fishing Boat Rods Holder 360 Degree Rotation Adjustable Power Lock Fishing Rod Racks Folding Holder with Large Clamp Open; 2018 Retrieved from: https://www.amazon.com/Fishing-Rotation-Adjustable-Folding-Opening/dp/B075Q67BL6.

* cited by examiner

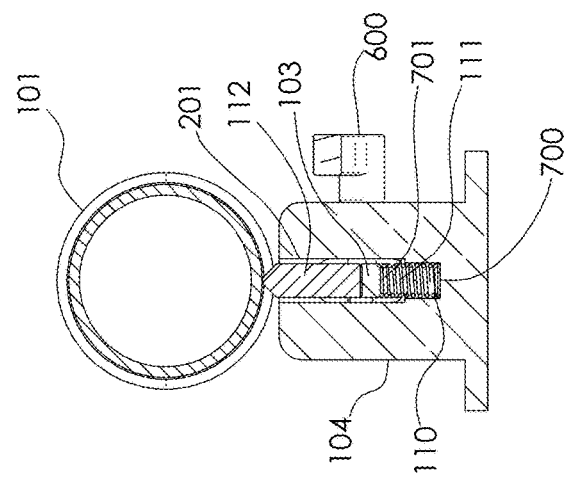
SECTION B-B
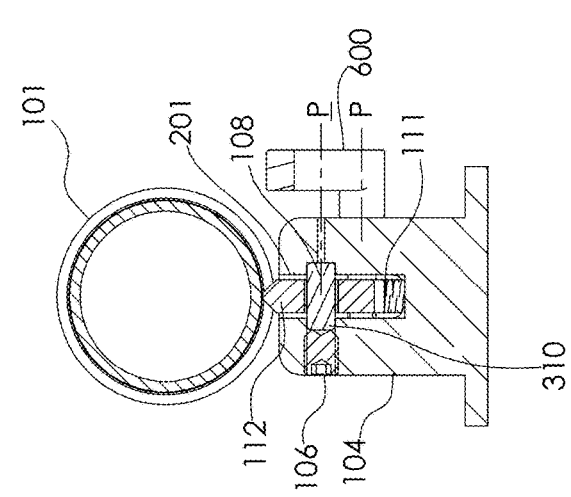
SECTION C-C
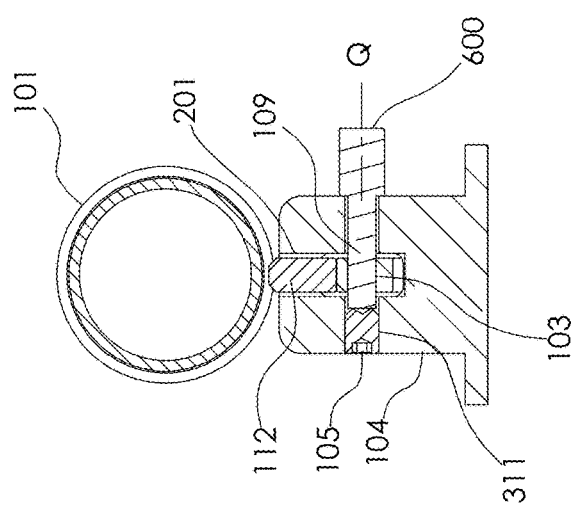
SECTION D-D
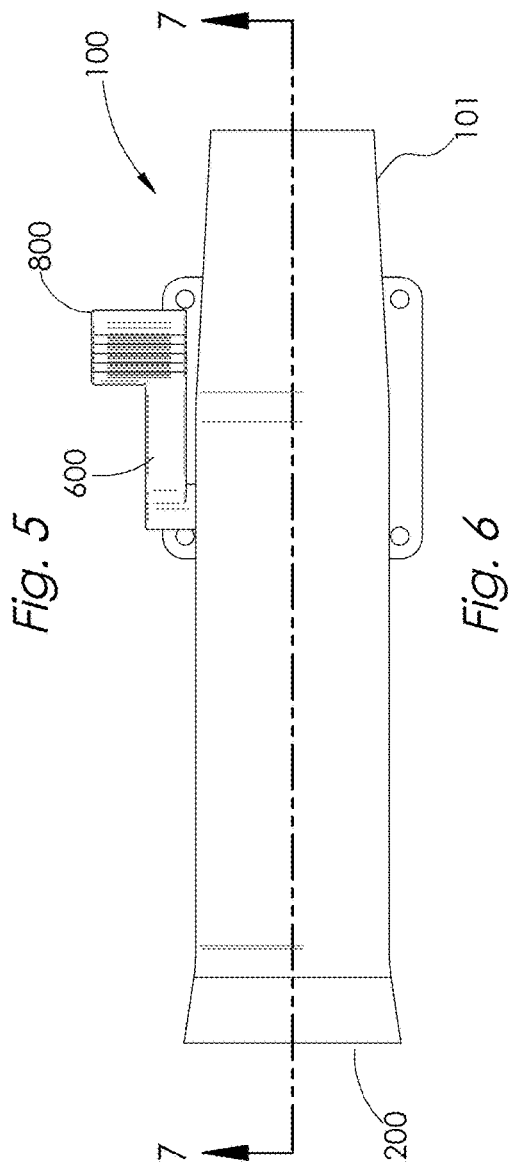
Fig. 5
Fig. 6

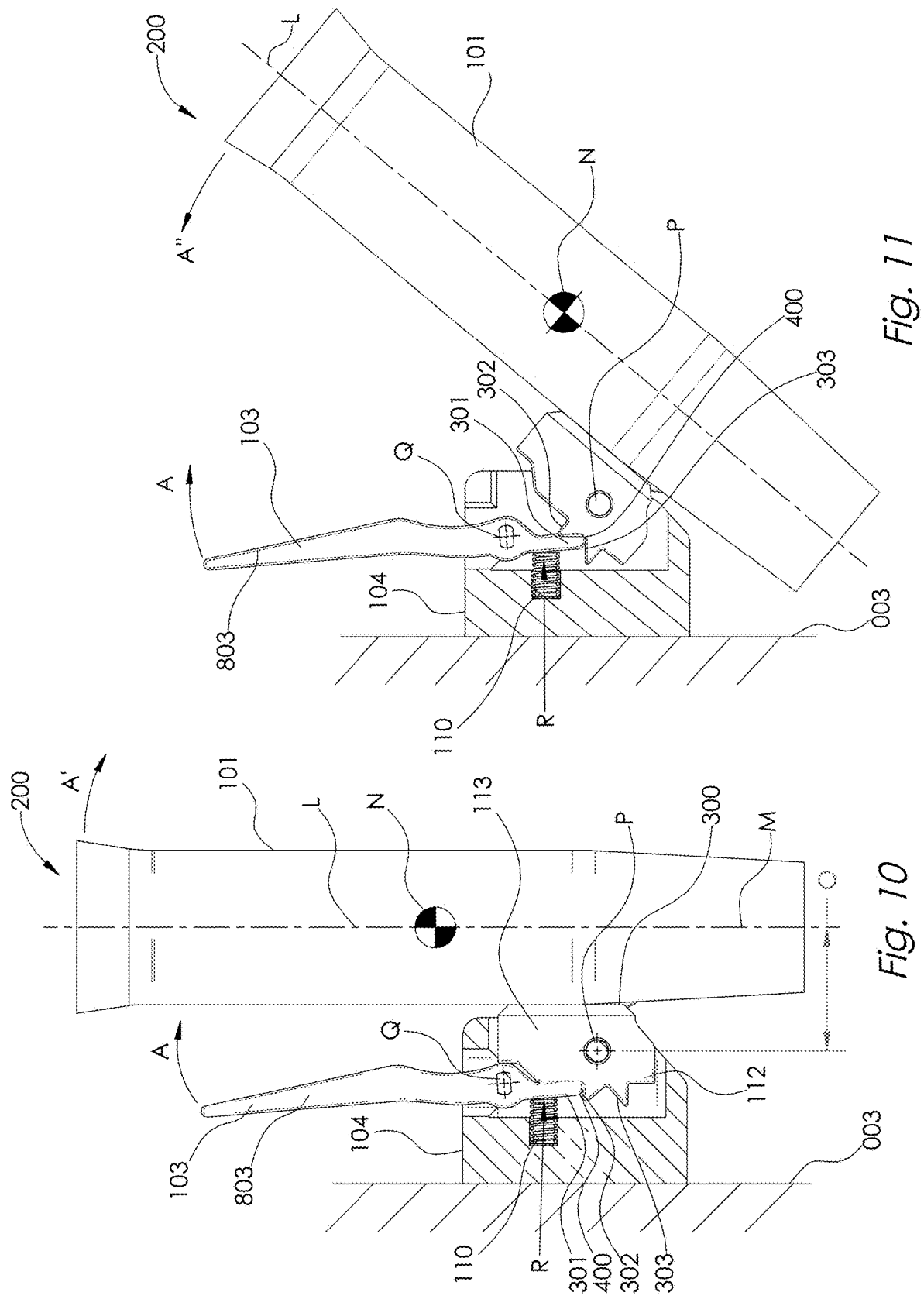

ROTATING ROD HOLDER

CROSS REFERENCE TO RELATED APPLICATIONS AND INCORPORATION BY REFERENCE

This application is a non-provisional of, and claims benefit of priority to, U.S. provisional patent application No. 63/089,244 entitled ROTATING ROD HOLDER, filed in the United States Patent and Trademark Office (USPTO) on Oct. 8, 2020, the disclosure of which is incorporated herein by reference in its entirety.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

BACKGROUND OF THE INVENTION

1. Field of the Invention

The field of the invention relates generally to systems and methods for storing and/or transporting rod shaped devices, such as, for example and not by way of limitation, fishing rods. Further, the field of the invention relates to systems, devices and methods for storing and/or transporting fishing rods on a boat such that the fishing rods are easily insertable into a rod holder that is located underneath an overhead obstruction, such as a Bimini, T top or other structure.

2. Background Art

Non-rotating, or fixed, rod holders of the prior art typically comprise a tube-shaped structure that is attached to a mounting flange or other structure that affixes the rod holder to a receiving structure for storing the rods in a desired location. Typically, the orientation of the rod holder is not changeable: that is, it is fixed, usually through the attachment means which may be, for example, attachment by threaded fasteners, welding, chemical bonding or some other means of fixed attachment. This means that the rod holder is not able to be articulated or rotated in such a way as to allow insertion or removal of a rod in the case in which some other structure may be blocking or partially blocking access to the rod receiving opening of the rod holder.

As a non-limiting example of such cases, it is often desired to store and transport fishing rods on a fishing boat or other vehicle in such a manner that they are stored underneath an overhead structure such as a Bimini top or T-top. In these situations, the length of rod that is insertable into the fishing rod holder is limited by the distance from the opening of the rod receiving end of the rod holder to the underneath surface of the blocking overhead structure. This limitation may represent a serious limitation in the length of rod that is insertable into such a prior art rod holder. In these instances, the distance from the opening of the rod receiving end of the rod holder to the floor or other structure underneath the rod holder represents a reduction on the length of rod that is usable in that particular rod holder, because it is not possible to insert a rod that is longer than the distance from the opening of the rod holder to the underneath surface of the overhead structure into the rod holder. Any attempt to insert a longer rod would necessarily involve bending the rod in such a manner as to reduce its length so that it may fit underneath the overhead structure while being inserted into the prior art rod holder. While in some cases this may be possible, it is certainly not desirable, because it subjects the rod to bending stress which is likely to damage, or even break, the rod. This is but one exemplary case of many cases in which the fixed rod holders of the prior art leave much to be desired.

Continuing with the non-limiting example of a fishing rod, it is often desirable that the rod holders on a fishing boat accommodate rods of various lengths, as such various lengths may be useful to the user in various fishing situations. Rods for certain uses may only require a short length, while other uses may require a longer fishing rod. For example, when it is desired to cast long distance, a longer fishing rod is generally desirable. Such casting rods are typically too long to fit underneath the average Bimini or T top when inserted into a traditional rod holder mounted onto a vertical or near vertical surface underneath the Bimini or T top, without risking serious damage to the fishing rod.

Additionally, is often desired that a rod be accessible, which is to say removable from the rod holder, very quickly. This may be the case, for example, when a fishing boat comes upon potential game fish. In such cases is necessary to extract the fishing rod from the rod holder so that it may be placed into service in a minimum amount of time, while the game fish is still accessible. It is generally accepted that the more quickly a fishing rod can be accessed and placed in service, the more likely it is that the game fish may be caught. In such situations, it would be desirable that the rod holder allow quick and easy access for removal of a rod stored therein. Because the fixed rod holders of the prior art do not allow longer fishing rods to be stored underneath the Bimini top or T top, these rod holders are generally placed in locations on the boat that might make them difficult to quickly access. For example, a common location for fishing rod holder of the prior art is high off the deck, on the back of a T-top. Such rod holders of the prior art may be fixed to a rear portion of the T-top by welding or some other means of attachment. Since the T-top generally covers the helm station, these rod holders of the prior art are generally placed high enough off the boat deck such that they are out of the way of the crew moving underneath them as the crew gathers around the helm station. This means that they are not easily and quickly accessible. Again, this is due to the fact that these rod holders placed high off the deck may be the only rod holders on the boat that are able to accommodate longer fishing rods. If such fishing rods were able to be attached to a surface underneath the Bimini or T-top, they would be much more accessible and they would be able to be pressed into service on shorter notice. This distinction makes a difference, because the more quickly the fishing rod is pressed into service, the more likely it is the land the game fish.

What is needed in the art, therefore, is an apparatus and/or method adapted to enable the entire distance, or a greater portion of the distance as compared to the prior art, from the underneath surface of an overhead structure to an underneath surface, such as a floor of a boat, to be utilized in the storage and/or transport of a rod. It is further desirable that the rod holder enable quick and easy access for the removal of a rod stored therein.

BRIEF SUMMARY OF THE INVENTION

The present invention comprises an apparatus and method that have one or more of the following features and/or steps, which alone or in any combination may comprise patentable subject matter.

While the description and drawings contained herein depict fishing rod holders as may be mounted onto a fishing boat, is to be understood that this is but one exemplary example of many use cases of the rod holder of the invention. Thus, the fishing rod example embodiment depicted in the figures and described is not to be construed as a limitation of the invention, or of its use cases. The rod holder of the invention may generally be used in any application in which it is desired to store or transport a rod-shaped structure wherein an overhead structure presents a hindrance to the entry of a rod into the rod holder. The use of the word "overhead" herein is not limited to any particular orientation. "Overhead", as used herein means any structure that is placed in such a way as to block or partially block the opening of the rod receiving end of the holder, thus preventing the insertion of a rod into the rod holder, or making the insertion of a rod into the rod holder difficult.

In an embodiment, the rotating rod holder of the invention may comprise a base, a latch release lever rotatably attached to the base via a rotatable attachment, and a rod holder having a longitudinal axis rotatably attached to the base via a rotatable attachment. The base may be attached to a receiving structure or surface, such as, for example, a vertical or near vertical surface of a boat, watercraft, kayak or other vehicle. The rod holder may be able to transition between a latched stowed position and a rod insertion/removal position, in which either the latch release lever, a foot pedal, or both operable to release the latch mechanism and thereby allow the rod holder to transition from the latched stowed position to the rod insertion/removal position. The base may comprise a flange or clamp, and the flange may comprise at least one opening for removable attachment to the receiving structure using threaded fasteners or the like. Alternatively, the base may be permanently attached to the receiving structure by any means known in the art such as welding, chemical bonding, riveting, and so on.

In embodiments, the rotating rod holder of the invention may comprise a latch plate attached to the rod holder. The latch plate may be rotatably attached to the base and may have a center of rotation related to the base, forming the rotatable attachment between the rod holder and the base. The latch plate may have a first surface for receiving a latching surface of a latching protrusion on the latch release lever, such that when the rod holder is in the latched stowed position, the latch release lever latching surface is in communication, i.e. is in contact with, the first surface in said latch plate, latching the rod holder into the latched stowed position and preventing the rod holder from transitioning from the latched stowed position to the rod insertion/removal position, until either the latch release lever or foot pedal are motivated to remove contact between the latching surface of the latch release lever and the first surface of the latch plate, thus allowing the rod holder to rotate in a first direction from the latched stowed state to the rod insertion/removal state.

In embodiments, the latch plate may further comprise a second surface that receives the latching surface of the latch release lever when the rod holder is in the rod insertion/removal position.

The latch release lever may be biased into a nominal position in which transition between the latched stowed sate and the rod insertion/removal state is resisted, by a biasing force. The biasing force may be provided by any structure capable of providing the biasing force. A non-limiting example of such structure is a compression spring disposed between a surface of the base and a surface of the latch release lever, applying the biasing force to a surface of the latch release lever. A spherical load transferring structure may optionally be disposed between the compression spring and the surface of the latch release lever upon which the biasing force acts.

In embodiments, when the rod holder base is attached to a vertical or near vertical surface, the center of mass of the rod holder may be, but is not necessarily, horizontally offset from the rod holder axis of rotation, allowing the force of gravity to act on the rod holder center of mass with a moment that causes the rod holder to rotate towards the rod insertion/removal position when the latch release lever, or foot pedal, are operated so as to remove contact between the latching surface of the latch release lever and the first surface of the latch plate, effectively unlatching the rod holder from the latched stowed position.

In embodiments, the base and latch release lever may be comprised of metal such as aluminum or stainless steel, or may be comprised of any material having mechanical properties sufficient to withstand the applied forces that may be expected in normal use. The latch plate may comprise one or more materials, including a friction reducing material forming at least a part of any surface of the latch plate that is in contact with other surfaces of the invention, such as, for example, the surfaces of the first surface of the latch plate and/or the second surface of the latch plate.

The present invention overcomes the shortcomings of the prior art in that it allows controlled rotation of a rod holder, such that the rod receiving end of the rod holder is disposed at an angle so as to allow insertion of a rod or other elongate structure, such as a fishing rod, into the rod holder, while avoiding interference from and overhead structure, and thus the rod holder of the invention is able to receive the insertion of longer rods than the rod holders of the prior art.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating the preferred embodiments of the invention and are not to be construed as limiting the invention. In the figures of the drawings, like callouts refer to like elements. In the drawings:

FIG. 5 depicts a series of cross-sectional views of an embodiment of a latchable rotatable rod holder of the invention.

FIG. 6 depicts a top view of an embodiment of a latchable rotatable rod holder of the invention taken orthogonal to the longitudinal axis of the rod holder.

FIG. 10 depicts a view of an embodiment of a latchable rotatable rod holder of the invention attached to a vertical or nearly vertical surface 003, in which the latchable rotatable rod holder is depicted in a stowed and latched position. In this view, the latch release lever 103 is shown in a latched stowed position, preventing the transition of rod holder 101 to the rod insertion/removal position unless release lever 103 is motivated in the direction of arrow A.

FIG. 11 depicts a view of an embodiment of a latchable rotatable rod holder of the invention attached to a vertical or nearly vertical surface in which the rotatable rod holder is depicted in a rod insertion/removal position. In this view, latch release lever 103 is shown in a latching position, preventing the further rotation of rod holder 101 in the firs direction of rotation A' away from the latched stowed position. In this position, rod holder 101 may be motivated, i.e. rotated, back into a latched stowed position by motivating the rod receiving end 200 of rod holder 101 in the direction of arrow A", i.e., opposite the first direction of rotation A'.

DETAILED DESCRIPTION OF THE INVENTION

Figure 1:
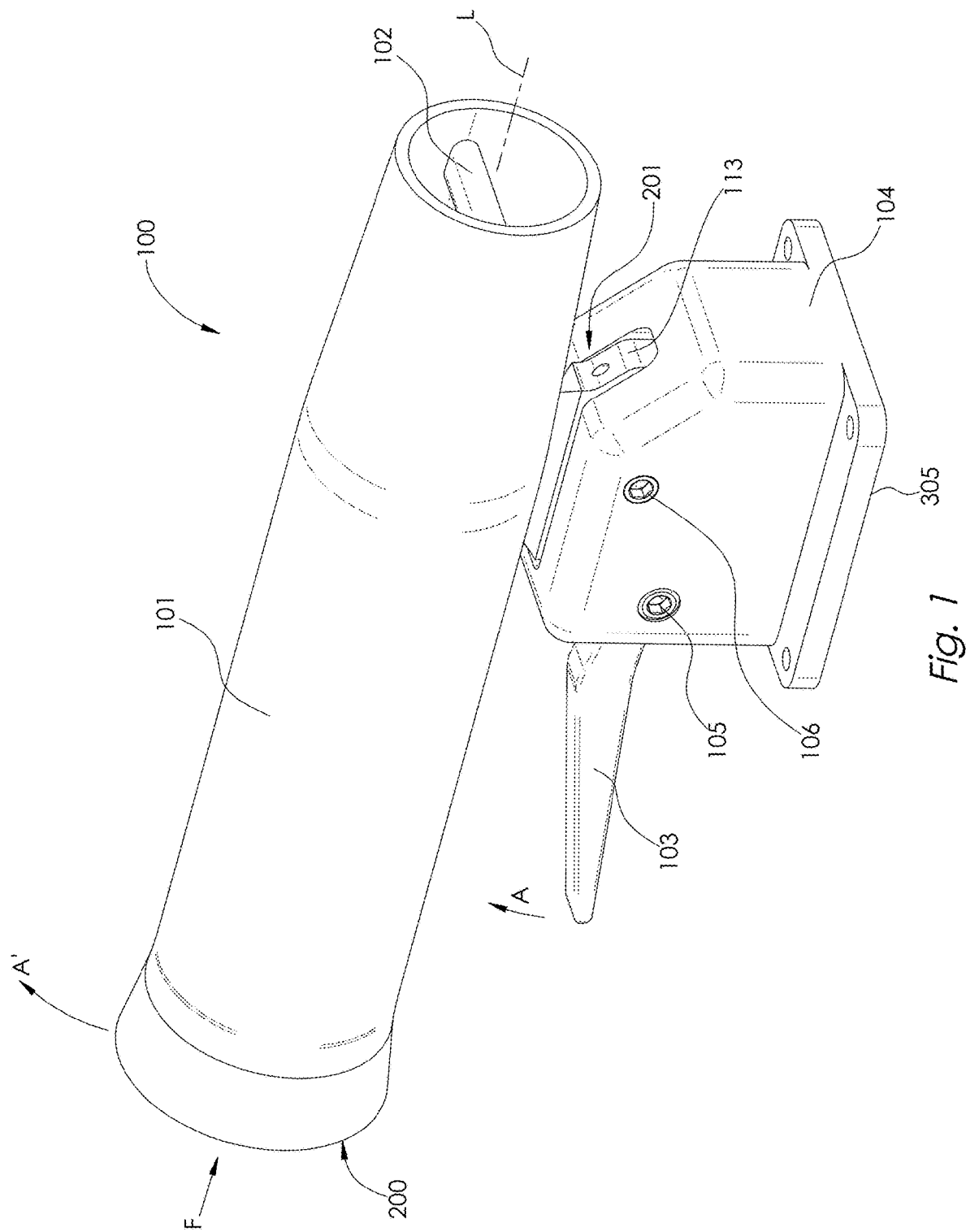
FIG. 1 depicts a perspective view of an embodiment of a latchable rotatable rod holder of the invention.

The following documentation provides a detailed description of the invention.

Although a detailed description as provided in the attachments contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention. Thus the scope of the invention should be determined by the appended claims and their legal equivalents, and not merely by the preferred examples or embodiments given.

The various embodiments may comprise any, all, or some of the features and elements described, shown or claimed herein and in the drawings, in any order, in any quantity, and in any combination. Thus, again, the embodiments depicted in the drawings and described in the written description are exemplary in nature, and not meant to be limiting. Thus, embodiments of the invention do not necessarily include each and every feature depicted or described, and, likewise, embodiments of the invention may include each feature shown, or only some features and not others.

As used herein, "vertical" and "nearly vertical" are used to identify orientations of the rod holder in which the force of gravity acting on rod holder 101 through its center of mass N is offset by a distance O from the center of rotation P of rod holder 101, creating a moment that tends to cause rod holder 101 to rotate its open rod receiving end 200 away from the receiving structure, such as receiving structure 003 depicted in the figures, thus tending to rotate the rod holder 101 toward the rod insertion/removal position.

A used herein, "up" and "upward" indicate a direction opposite the force generated by gravity on an object. Generally, "up" and "upward" indicate a direction away from the gravitational center of the Earth.

Figure 2:
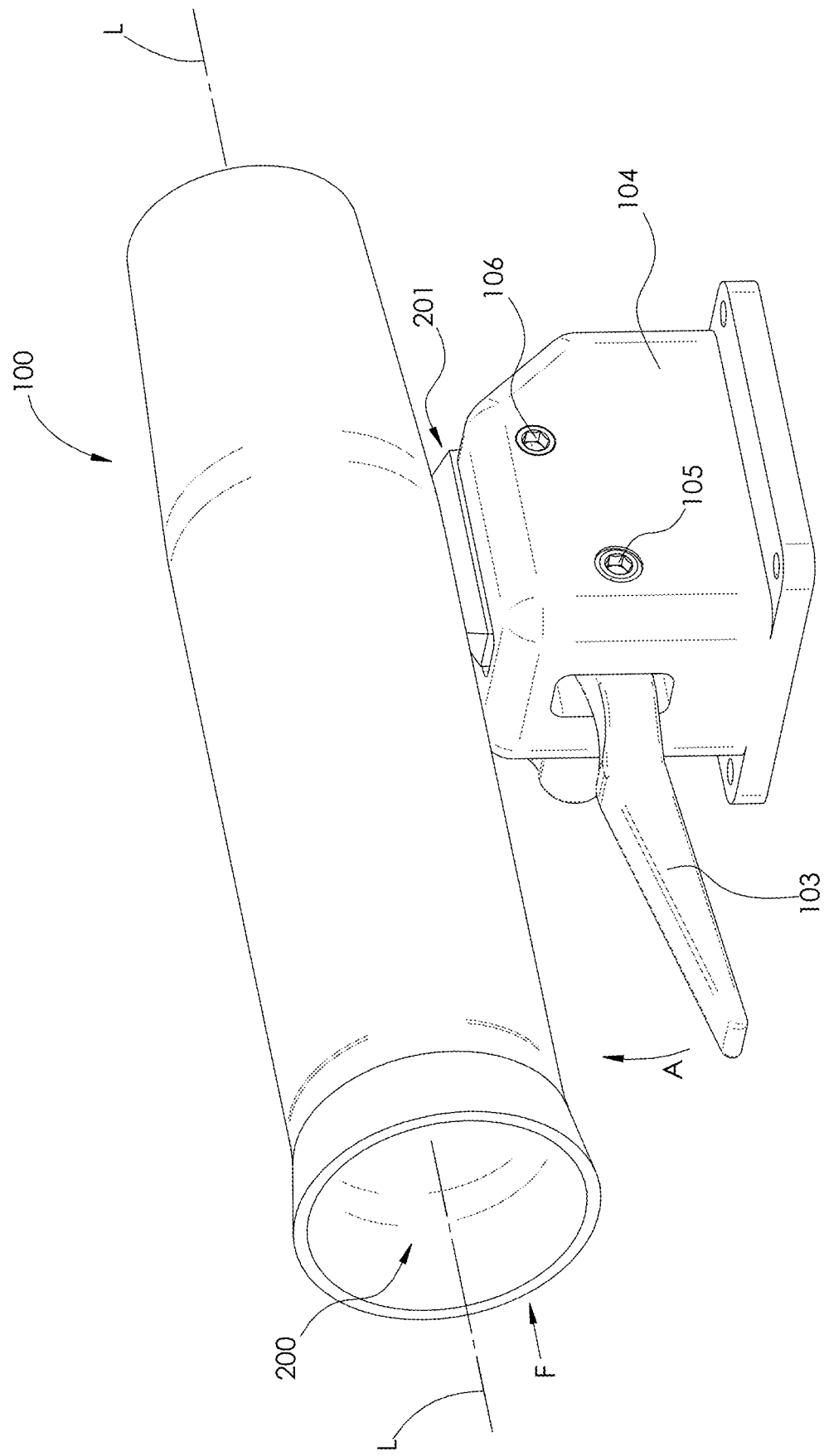
FIG. 2 depicts a front perspective view of an embodiment of a latchable rotatable rod holder of the invention.

Referring now to FIGS. 1 and 2, perspective views of an embodiment of the latchable rotatable rod holder 100 of the invention are depicted. The latchable rotatable rod holder of the invention 100 may comprise a rod holder 101 having an opening 200 for receiving a rod inserted into rod holder 101 in the direction of arrow F. Opening 200 may optionally be flared as shown to accommodate easy entry of a rod into rod holder 101. Rod holder 101 may be an elongate structure having a length, a lengthwise opening such as 401 (see FIG. 7) and end with an opening 200 allowing a rod to be inserted through the open end 200, allowing the rod to be received along at least a portion of the rod holder length. Rod holder 101 may further comprise an optional stop bar or other structure 102 disposed in the end of rod holder 101 opposite from rod receiving end 200. Stop bar 102 may take any mechanical configuration desirable. It operates to prevent the insertion end of a rod from protruding all the way through rod holder 101. Stop bar 102 provides a resting surface for a rod inserted into rod holder 101 when a rod holder of the invention is attached to a vertical or nearly vertical surface. The rotatable rod holder 100 may further comprise a base 104. Base 104 may comprise an optional flange 305 or other means for attaching the latchable rotating rod holder 100 to a receiving structure such as a wall or surface of a boat or other surface to which it is desired to attach the latchable rotating rod holder of the invention. The attachment of optional flange 305 to a receiving structure (such as receiving structure 003 depicted in FIGS. 8 and 9) may be by any means in the art including but not limited to attachment using threaded fasteners for a removable attachment, or permanent attachment such as welding or chemical bonding. Base 104 may comprise a void 201 allowing a portion of latch plate 112 to protrude from base 104, where it may be removably or permanently rotatably attached to an exterior surface of rod holder 101. The attachment of latch plate 112 to a surface of rod holder 101 may be by any means known in the mechanical arts such as, for example and not by way of limitation, welding or chemical bonding. The attachment of latch plate 112 to a surface of rod holder 101 may be by means of a permanent or a removable attachment. Latch plate 112 protrudes into base 104 through opening 201 where it forms a rotatable attachment to base 104 and where surfaces of latch plate 112 communicate with surfaces of latch release lever 103 to latch the rod holder in the latched stowed position, and to enable transition to the rod insertion/ removal position, as further described herein.

Figure 3:
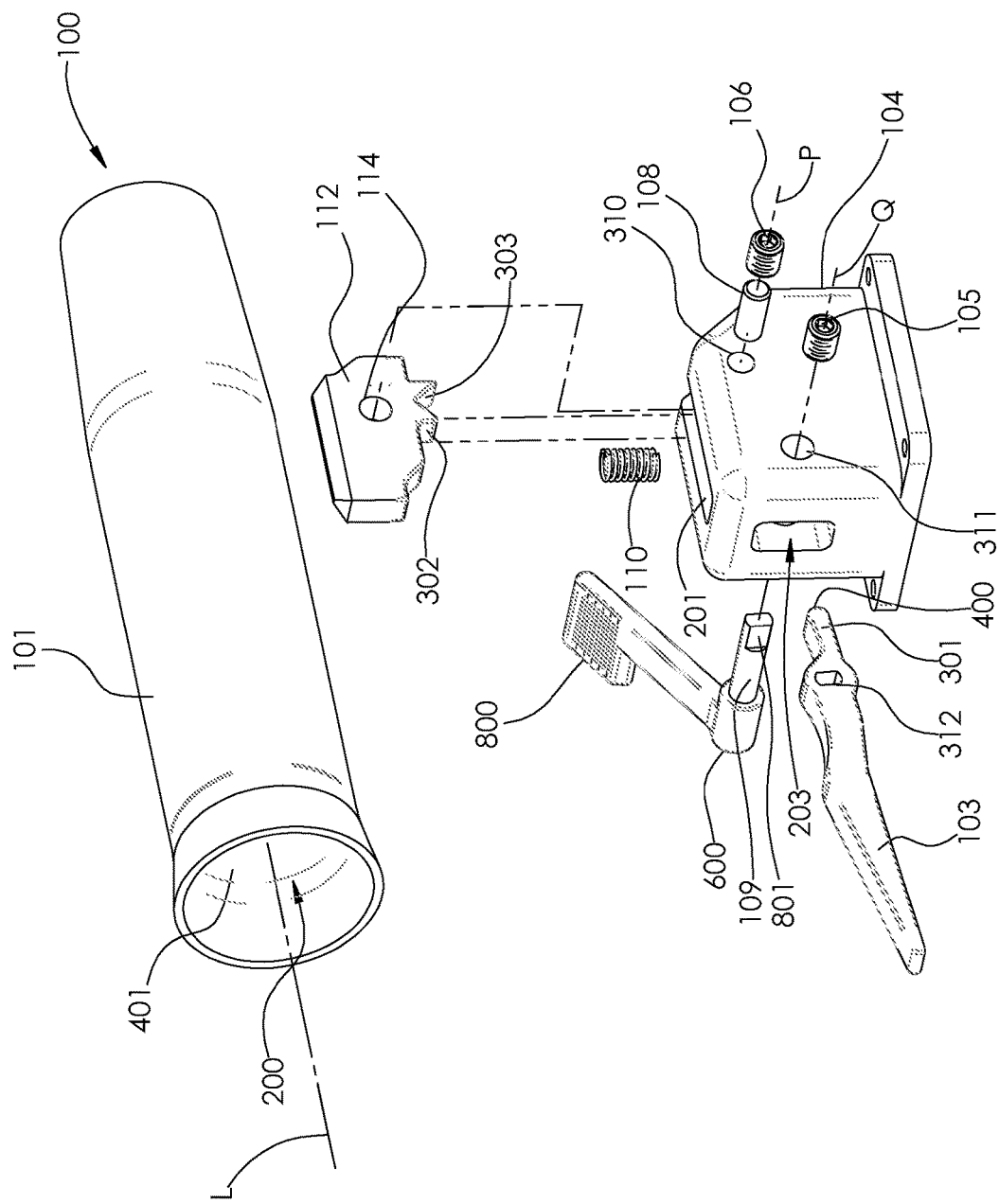
FIG. 3 depicts an exploded perspective view of an embodiment of a latchable rotatable rod holder of the invention, and shows optional foot pedal 800 which may be used to operate the rod holder of the invention in a hands-free mode.

Still referring to FIGS. 1 and 2, the rotatable attachment of latch plate 112 to base 104 may be accommodated by a rod holder pivot pin 108 forming an axle for latch plate 112 as depicted in FIG. 3, held in place by a male threaded rod holder pivot pin retaining screw 106 that may be threadingly engaged with matching female threads formed in base 104. Latch release lever 103 may be rotatably attached to base 104 by means of a release lever pivot pin 109 forming a axle enabling rotation of latch release lever 103 relative to base 104 as further depicted in FIG. 3, held in place, in embodiments, by release lever pivot pin retaining screw 105 or equivalent structure. In operation, latch release lever 103 may be motivated (i.e. rotated relative to base 104 about axis of rotation Q as shown in FIG. 3) for example, by the hand of a user, in the direction of arrow A, unlatching the latching mechanism that is formed by surfaces of latch release lever 103 and latch plate 112 disposed in base 104, allowing the rod receiving end 200 of rod holder 101 to rotate away from a surface to which flange 305 is attached in a first direction rotation depicted by arrow A', and allowing rod holder 101 to be transitioned to and then disposed in a rod insertion/ removal position as depicted in more detail in FIG. 11.

Referring now to FIG. 3, a perspective exploded view of an embodiment of the rotatable rod holder of the invention 100 is depicted. Rod holder 101 may be attached to latch plate 112. Latch plate 112 may comprise any material as may be desired by the user, such as aluminum, stainless steel, phenolic, plastic, other metals, Delrin, or Teflon or any other material that is suitable as may be known in the art. The use of a bearing material for friction bearing surfaces of latch plate 112 may accommodate repeated uses of the device, and prevent wear-and-tear by reducing friction between the latching surface 400 of latch release lever latching protrusion 301 and the first and second surfaces disposed in latch plate 112. These first and second surfaces and their interaction with latch release lever latching surface 400 of the release lever latching protrusion 301 are further depicted in FIGS. 10 and 11. The material comprising latch plate 112 may, in embodiments, be any material operable to reduce friction between the surfaces of release lever latching protrusion 301 and the first and second latch plate surfaces 302 and 303, respectively, while providing enough rigidity to perform the latching function of the latching mechanism of the invention.

Still referring to FIG. 3, an exemplary embodiment of the rod holder rotatable attachment to base 104 is now described. Rod holder pivot pin 108 may be inserted into receiving opening 310 such that it protrudes across opening 201 in base 104, and protrudes through opening 114 in latch plate 112, thus forming an axle for rotating latch plate 112 about the axis P created by rod holder pivot pin 108. Thus rod holder 101 is rotatable about base 104 by virtue of the attachment between latch plate 112 and rod holder 101, about center of rotation P, as further depicted in FIGS. 10 and 11. Rod holder pivot pin 108 may be retained in place by rod holder pivot pin retaining screw 106 or equivalent structure. Thus, in embodiments, a rod holder rotatable attachment to base 104 is formed by the rotable attachment of latch plate 112 to base 104 via rod holder pivot pin 108 and the openings 310 and 114 that may receive rod holder pivot pin 108 in a rotatable attachment.

Still referring to FIG. 3, exemplary embodiments of the latch release lever 103 rotatable attachment to base 104 are now described. Two (of many) embodiments of the latch release lever 103 rotatable attachment to base 104 are described: one comprising optional foot pedal 800 that allows for hands-free operation of the invention, and one that does not comprise optional foot pedal 800.

In an exemplary embodiment comprising optional foot pedal 800, the rotatably attachment of foot pedal 800 to base 104 via foot pedal lever 600 as follows. Latch release lever pivot pin 109 portion, which may form a portion of optional foot pedal lever 600, may be inserted into receiving opening 311 in base 104 such that it protrudes across opening 203 in base 104, and through opening 312 in latch release lever 103, thus forming an rotatable axle for rotating foot pedal 800 and latch release lever 103 about center of rotation Q as depicted in FIGS. 10 and 11. The latch release lever pivot pin 109 portion may comprise at least one flat surface 801 that extends along the portion of latch release lever pivot pin 109 portion that is received by matching opening 312 in latch release lever 103. In the case in which latch release lever pivot pin 109 comprises at least one flat surface 801, opening 312 may comprise matching at least one flat surface such that when latch release lever pivot pin 109 portion is received by opening 312 and foot pedal 800 is rotated, as, for example, depicted by arrow T in FIG. 4, latch release lever is rotated along arrow A. Thus, in an embodiment comprising optional foot pedal 800, the rotation of optional foot pedal 800 along arrow T has the same effect as rotation of latch release lever along arrow A. The optional foot pedal 800 feature allows a user to unlatch the rod holder 100 by simply pressing foot pedal 800 with a foot or toe, causing rod holder 100 to transition from the latched stowed position to the rod insertion/removal position in the same manner as when latch release lever 103 is rotated in the direction of arrow A, without the need to use either hand. I.e., optional foot pedal 800 enables "hands-free" operation.

In other exemplary embodiments that do not comprise optional foot pedal 800 or foot pedal connector 600, the rotating attachment of latch release lever 103 in base 104 may be accomplished by a cylindrical or other shaped pin 109 that is received by opening 311 in base 104, the pin extending across opening 203 in base 104, and passing through opening 312 in latch release lever 103. In this embodiment, opening 312 may be a circular opening adapted to receive latch release lever pin 109, forming a rotatable attachment of latch release lever 103 in base 104. Release lever pivot pin 109 may be held in place by a latch release lever pivot pin retaining screw 105 or equivalent structure. Thus, in embodiments, a latch release lever rotatable attachment with base 104 is formed by the rotatable attachment of latch release lever 103 to base 104 via latch release lever pivot pin 109 and the opening 311 in base 104, and opening 312 in latch release lever 103, that may receive latch release lever pivot pin 109 in a rotatable attachment.

While the structures described herein and depicted in the figures provide exemplary structure for establishing a rotating attachment of latch plate 112 to base 104, and for establishing a rotating attachment of latch release lever 103 to base 104, it is to be understood that any structure capable of providing a rotating attachment of these elements to base 104 are included within the intended scope of the invention.

Also depicted in FIG. 3 is compression spring 110 which may be used to provide a biasing force on latch release lever 103, biasing latch release lever 103 to remain into the latched position unless motivated away from the latched position by the application of an external force, such as the hand of a user, as is further described herein. Opening 200 for receiving a rod to be stowed in the rod holder of the invention, and direction F which indicates the direction in which a rod may be inserted into rod holder 101, are also depicted for reference.

Figure 4:
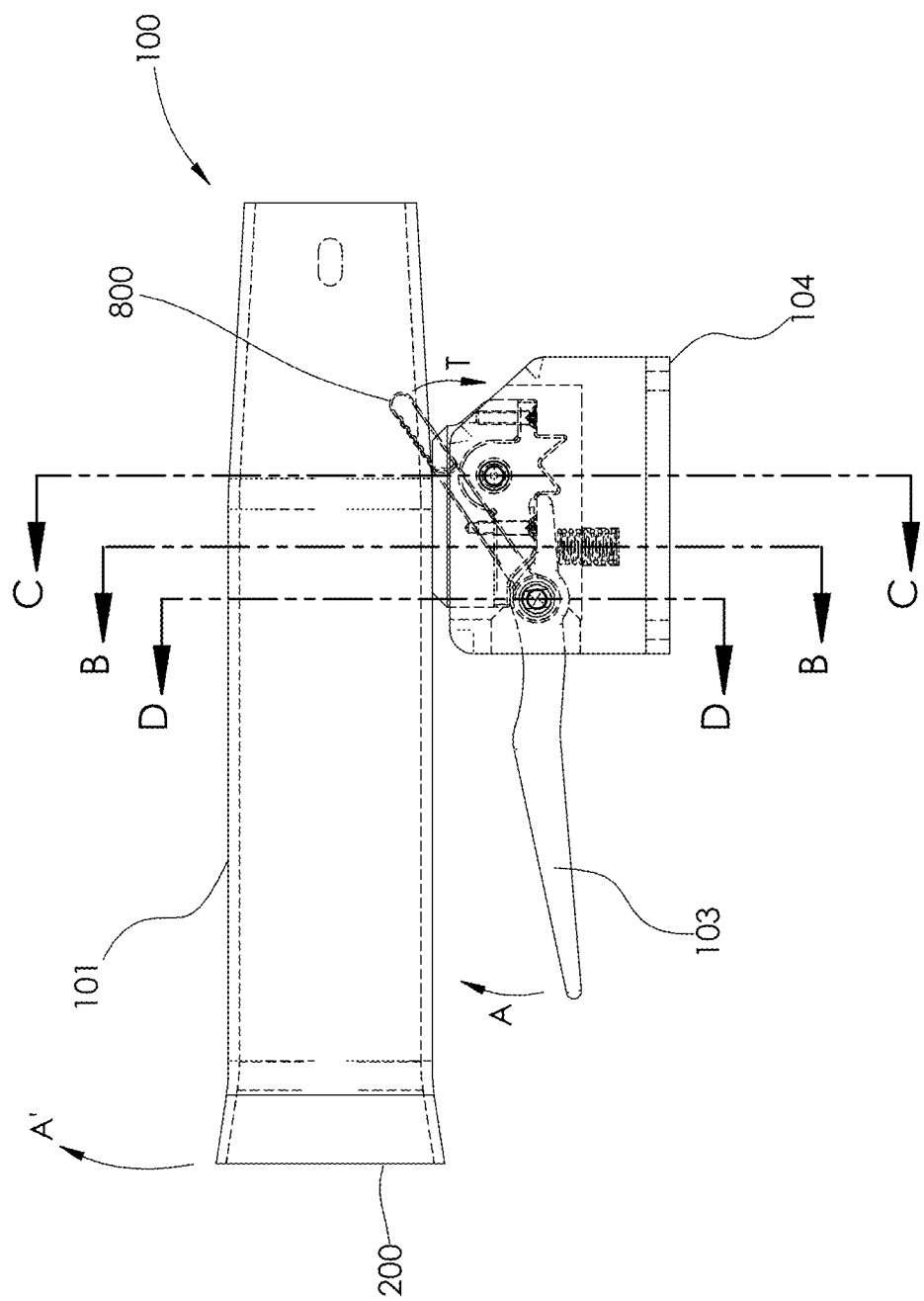
FIG. 4 depicts an orthogonal side view of an embodiment of a latchable rotatable rod holder of the invention, showing hidden lines were components and features are hidden within the rod holder base. In this view, the rod holder of the invention is shown in the stowed, latched position. This view also depicts the planes of view of several section views that are depicted in FIG. 5.

Referring now to FIG. 4, an orthogonal side view of an embodiment of the rotating rod holder of the invention 100 is depicted. Rod holder 101, rod receiving opening 200, direction of latch release lever travel A in which the latch release lever may be rotated in order to unlatch the rod holder from the latched stowed position and allowing rod holder 101 to rotate in a first direction of rotation along A' to the rod insertion/removal position, latch release lever 103 and base 104 are depicted for reference. Cross-section reference designators B-B, C-C and D-D are also depicted. Optional foot pedal 800 may be rotated along arrow T by, for example, the foot or toe of a user, having the same effect as rotating latch release lever 103 in the direction of arrow A.

Referring now to FIG. 5, cross-sections B-B, C-C, and D-D are depicted. In these cross-sections, the relative positions of latch plate 112, rod holder 101, release lever pivot pin 109, release lever pivot pin retaining screw 105, rod holder pivot pin 108, rod holder pivot pin retaining screw 106, compression spring 110, and base 104 are depicted. Section B-B depicts latch plate 112 which is attached to rod holder 101 disposed in opening 201 in base 104, and showing compression spring exerting a biasing force on a surface of latch release lever 103. Section C-C depicts latch plate 112 which is attached to rod holder 101 disposed in opening 201 in base 104, and showing the rotatable attachment of latch plate 112 to base 104 via rod holder pivot pin 108 that protrudes through opening 114 in latch plate 112 and opening 310 in base 104. Section D-D depicts latch plate 112 which is attached to rod holder 101 disposed in opening 201 in base 104, and showing an embodiment of the rotatable attachment of latch release lever 103 to base 104 via latch release lever pivot pin 109 that protrudes through opening 312 in latch release lever 103 and opening 311 in base 104.

Referring now to FIG. 6, a top view of an embodiment of the rotatable rod holder 100 of the invention is depicted for the purpose of showing cross-section reference 7-7. Rod holder 101 and rod receiving opening 200 are depicted for reference.

Figure 7:
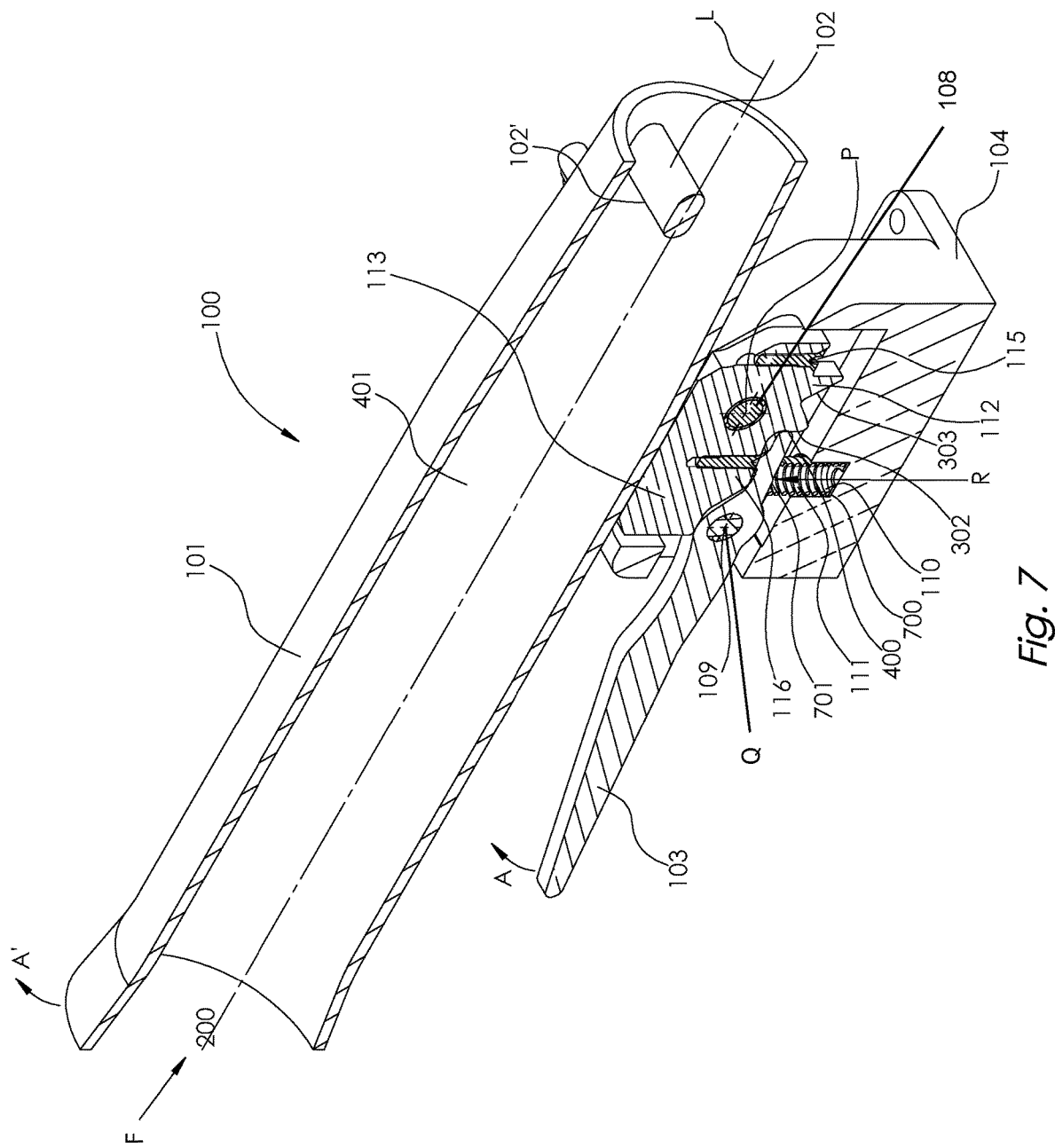
FIG. 7 depicts a lengthwise cutaway perspective view of an embodiment of a latchable rotatable rod holder of the invention, taken along the longitudinal axis of the rod holder.

Referring now to FIG. 7, a cross-section view of an embodiment of the rotatable rod holder 100 of the invention is depicted. Rod holder 101 may be attached to latch plate 112 as described elsewhere herein. Stop bar 102, which may have a first end and a second end that are attached to inner surfaces of rod holder 101, provides a resting surface 102' against which a rod end inserted into rod receiving opening 200 from the direction of arrow F may rest when the rod holder of the invention 100 is attached to a vertical or nearly vertical receiving structure (such as, for example, the vertical or nearly vertical side surface of a boat helm station).

Figure 8:
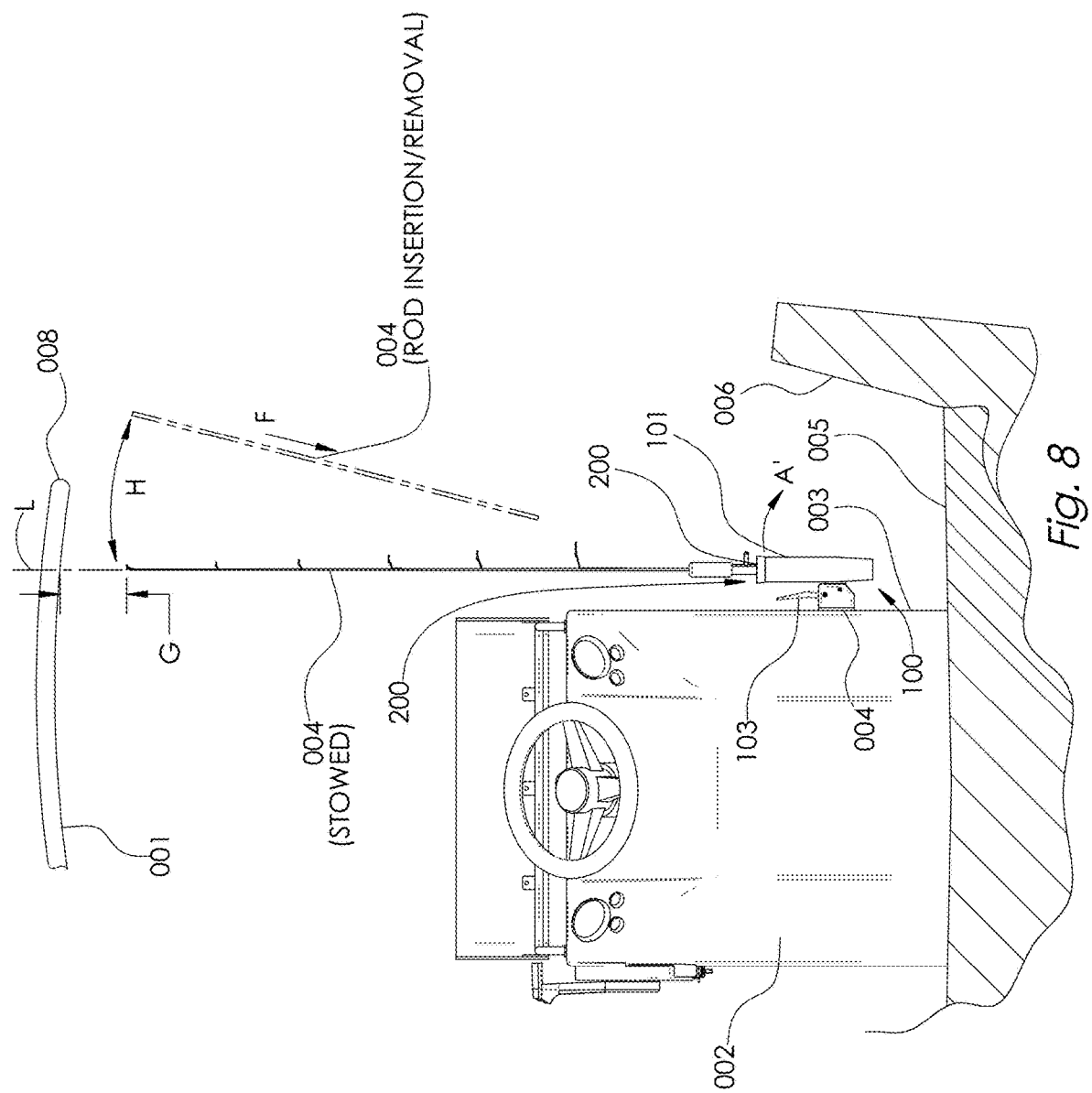
FIG. 8 depicts a view of an exemplary use case of an embodiment of a latchable rotatable rod holder of the invention, in which the latchable rotatable rod holder is attached to a vertical side surface of a typical boat helm station, underneath an overhead structure which may be, for example, a Bimini or T-top. The rod is shown in solid lines to depict the latched stowed position and in dashed lines to depict the rod insertion/removal position. This is but one non-limiting, exemplary use case of many use cases.

The latching mechanism of the invention, which, in embodiments, may comprise latch release lever 103, latch plate 112, compression spring 110, rod holder pivot pin 108, and latch release lever pivot pin 109, form an embodiment of the latching mechanism of the invention. Compression spring 110 acting between a surface 700 of base 104 and a surface 701 of latch release lever 103 provides a biasing force R acting on a surface of latch release lever 103, biasing latch release lever 103 into the latching position as depicted in FIG. 7 (and also as depicted in FIGS. 8 and 10). Compression spring 110 may be disposed in an opening 111 in base 104. An optional spherical structure may be disposed between compression spring 110 and the surface of latch release lever 103 to provide more positive contact for application of biasing force R. When latch release lever 103 is motivated in the direction of arrow A by an applied motivational force, such as the hand or fingers of a user, or by a user rotating optional foot pedal 800 along arrow T as depicted in FIG. 4, to the extent the applied motivational force overcomes the biasing force R supplied by compression spring 110, latch release lever 103 is rotated on axis Q towards an unlatched position as compression spring 110 is compressed, and the latching mechanism unlatches as latching surface 400 of latch release lever 103 is rotated out of contact with first surface 302 of latch plate 112, allowing rod holder 101 to rotate in a first direction of rotation in the direction of arrow A' such that, for example, the receiving opening 200 of rod holder 101 rotates away from a receiving structure 003 to which base 104 is attached. This is further depicted in FIGS. 8, 9, 10 and 11. Center of rotation of rod holder Q, and rod holder pivot pin 108 are shown for reference. Center of rotation of latch release lever Q, and latch release lever pivot pin 109, are also shown for reference. Lengthwise opening 401 runs along rod holder longitudinal axis L for receiving an end and length of rod to be stowed in the rod holder of the invention 100. The rod to be stowed may have a length, a portion of which may be inserted into rod holder 100 through opening 200 to be received by lengthwise opening 401 in rod holder 101. When the portion of rod length is inserted into and received by lengthwise opening 401 of rod holder 101, the rod is stowed, or retained, in rod holder 101. In the use case in which base 104 is attached to a vertical or near vertical surface, an end of the rod received into lengthwise opening 401 may rest against surface 102' of stop bar 102 such that the rod is retained in lengthwise opening 401 of rod holder 101 by the force of gravity. Lengthwise opening 401 may comprise an inner surface, or plurality of surfaces, that may be of any cross-sectional shape such as circular, square, rectangular, oval, or any other cross-sectional shape. Although a circular cross section of the inner surface of rod holder 101 is depicted in the drawings, this is but an exemplary depiction for explanatory purposes. Screws 115 and 116 may be threadingly engaged with matching receiving female threaded holes in base 104 for retaining an optional bearing material on latch plate 112.

Figure 9:
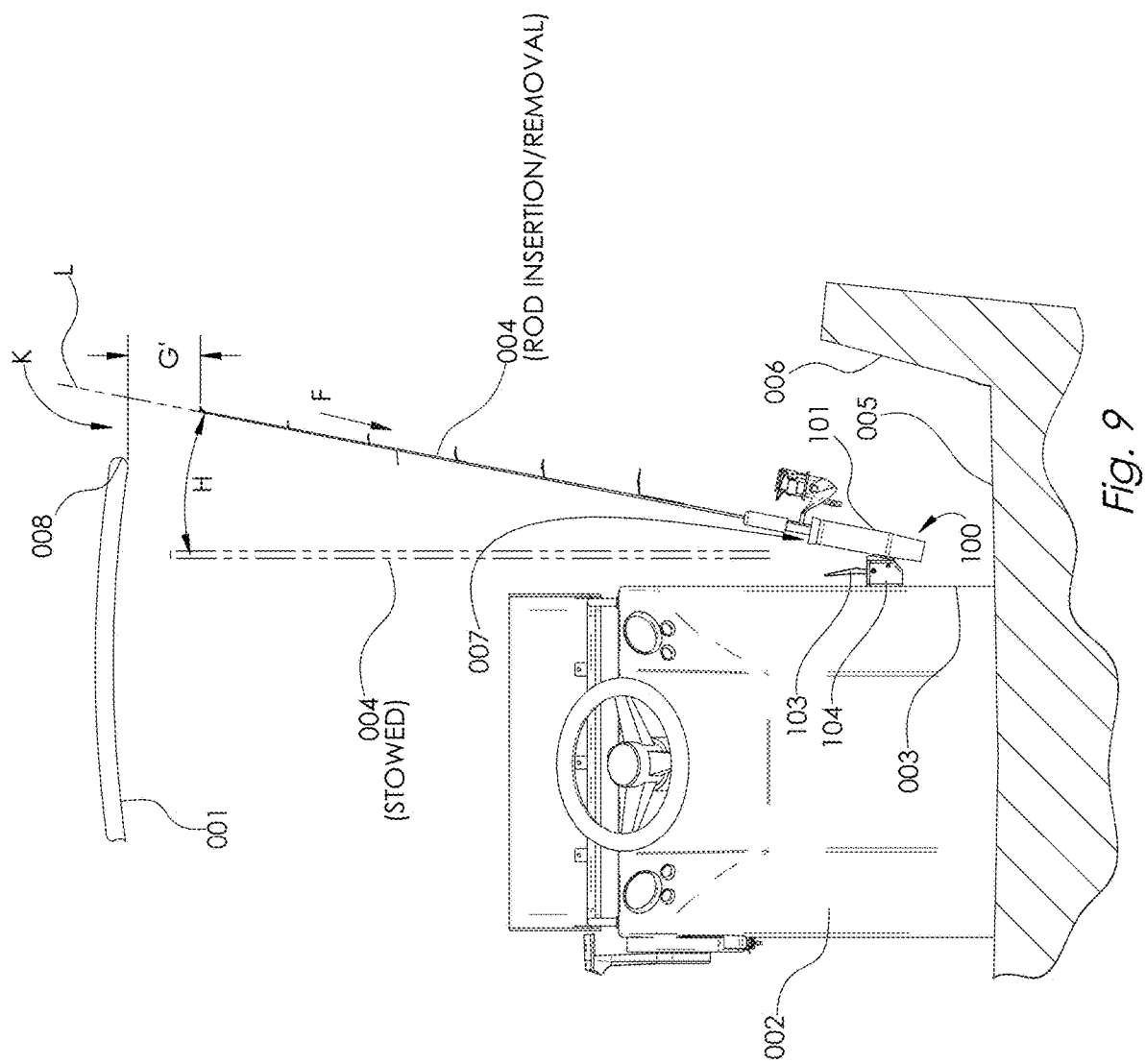
FIG. 9 depicts a view of an exemplary use of an embodiment of a latchable rotatable rod holder of the invention, in which the latchable rotatable rod holder is attached to a vertical side surface of a typical boat helm station, underneath an overhead structure which may be, for example, a Bimini or T-top. The rod is depicted in solid lines in rod insertion/removal position and is depicted in dashed lines to show rod stowed position. This is but one exemplary use case of many use cases.

Referring now to FIGS. 8 and 9, an exemplary use case for the rotating rod holder of the invention 100 is depicted. This is but one of many use cases, and, further it is not necessary that each use case involve a fishing rod, or be utilized on a boat. In FIG. 8, rod 004, which may be, for example a fishing rod or any elongate structure able to be received by lengthwise opening 401 of rod holder 101, is depicted in a latched stowed position, before it is rotated into the rod insertion/removal position. In FIG. 9, rod 004 is depicted in the rod insertion/removal position, from which it may be moved back into the latched stowed position along arrow A" as described herein. A rotating rod holder 100 of the invention is depicted as attached to a vertical or nearly vertical receiving structure 003. In the non-limiting exemplary use case depicted in FIGS. 8 and 9, receiving structure 003 is depicted as forming a part of a helm station on a boat 002.

Still referring to FIGS. 8 and 9, as can be seen in the depicted example, overhead structure 008 blocks or partially blocks direct vertical entry of a rod such as fishing rod 004 into receiving opening 200 of rod holder 101 when rod holder 101 is in the latched stowed position. However, when latch release lever 103 is motivated as depicted by arrow A in FIGS. 1, 2, 4 and 7, the latching mechanism within base 104 may become unlatched when latching surface 400 of latch release lever 103 comes out of contact with the first surface 302 of latch plate 112, allowing rod holder 101 to rotate in a first direction of rotation in the direction of A', tilting its open rod-receiving open end 200 away from receiving structure 003 and placing rod holder 101 in a rod insertion/removal position as depicted in FIG. 9. This disposes longitudinal axis L of rod holder 101 at an angle H to the rod holder latched stowed position such that rod 004 may be directly inserted into, or removed from, rod-receiving end 200 of rod holder 101 without interference from the underneath surface 001 of overhead structure 008. The clearance between the upper tip of rod 004 and underneath the surface of overhead structure 008 is depicted as dimension G in FIG. 8, and as G' in FIG. 9. The movement of the upper tip of rod 004 as the rotating rod holder is operated to rotate rod 004 so as to be clear of overhead structure 008 by a distance K is depicted as angle H. In this manner, the rotation of the rotating rod holder 100 of the invention from the latched stowed position to the rod insertion/removal position enables the insertion of longer rods into rod holder 101 than the rod holders of the prior art. Boat gunwales 006 and floor 005 are depicted for reference. Base 104 may be removably or fixedly attached to surface 003, or any other surface as desired.

Referring now to FIGS. 10 and 11, cross-section views showing the latching operation of an embodiment of the latching mechanism are depicted. In FIG. 10, the rotating rod holder of the invention is depicted in a stowed and latched position. In FIG. 11, the rotating rod holder of the invention is depicted in the rod insertion/removal position, in which the rotating rod holder has been unlatched and allowed to rotate from the latched stowed position such that the rod receiving and 200 of rod holder 101 has been rotated away from receiving structure surface 003, disposing rod holder longitudinal axis L at an angle to receiving structure surface 003 and allowing the insertion or removal of a rod into rod receiving opening 200 of rod holder 101 without interference from an overhead structure, such as the overhead structure 008 depicted in FIGS. 8 and 9.

Still referring to FIGS. 10 and 11, in an embodiment, rod holder 101 may have a longitudinal axis L. Rod holder 101 may also have a center of mass N which may be, but is not necessarily, disposed along longitudinal axis L that is displaced horizontally from rod holder center of rotation P by a distance O. Latch release lever 103 may comprise a latching protrusion 301 having a latching surface 400 that engages a first surface 302 disposed in latch plate 112 when the rod holder 100 is in the latched and stowed position as shown in FIG. 10. Latch release lever 103 may be held into the latched and stowed position as depicted in FIG. 10 by operation of biasing compression spring 110 acting with biasing force R on a surface of latch release lever 103. A spherical structure, which may be for example a spherically-shaped stainless steel ball, may be disposed between compression spring 110 and the surface of latch release lever upon which compression spring 110 applies biasing force R.

Referring now to FIG. 10, as latch release lever 103 is motivated along arrow A, or as foot pedal 800 is motivated along arrow T, overcoming biasing force R, the latch release lever 103 is rotated about latch release lever center of rotation axis Q, unlatching the latching mechanism by removing the contact between latching surface 400 of latching protrusion 301 of latch release lever 103 and first surface 302 of latch plate 112, allowing rod holder 101 to rotate in a first direction of rotation in the direction of A' by the force of gravity acting upon the center of mass N of rod holder 101 with a moment defined by the force of gravity acting on center of mass N horizontally offset from center of rotation P by distance O. Thus, when latch release lever 103 is manually operated, for example by the hand or fingers of a user, in the direction of arrow A, or when a foot of the user presses on pedal 800 in the direction T as depicted in FIG. 4, latching surface 400 is removed from contact with first surface 302 of latch plate 112, causing the latching mechanism to become unlatched, and rod holder 101 is allowed to rotate in a first direction of rotation along arrow A' under the influence of gravity acting on rod holder 101 center of mass N, transitioning the rod holder 101 into the rod insertion/removal position depicted in FIG. 11.

Referring now to FIG. 11, rod holder 101 is depicted as having been unlatched from the latched stowed position as hereinbefore described, and it has been rotated into the rod insertion/removal position. In this position, latching surface 400 of latch release lever 103 latching protrusion is engaged, i.e. is in contact with, second surface 303 disposed in latch plate 112, which acts to prevent further rotation of rod holder 101 in the first direction of rotation, i.e. in the direction of arrow A'. The biasing force R provided by compression spring 110 operates on a surface of latch release lever 103, tending to keep latching surface 400 in contact with the second surface of latch plate 112. Thus, rod holder 101 is securely held into the rod insertion/removal position as depicted in FIG. 11 and rod holder 101 is prevented from further rotation in the direction of arrow A'. When it is desired to return rod holder 101 to the latched stowed position, for example after a rod has been inserted into receiving opening 200 of rod holder 101, a manual force applied to rod receiving end 200 of rod holder 101 in the direction of A" causes rotation of the rod holder along A" back towards the latched stowed position. Some latch plate features, such as the back side of the protrusion forming first surface 302, may cause compression spring 110 to compress as latch plate 112 rotates along with rod holder 101 back towards the stowed latched position. To ease the rotation of rod holder 101 back towards the latched stowed position, a manual force may be applied to latch release lever 103 motivating it in the direction of arrow A, which helps to compress compression spring 110 and lessen the magnitude of biasing force R during this rotation of rod holder 101 back towards the latched stowed position. As rod holder 101 rotates back towards the latched stowed position along the direction of arrow A", the first surface 302 of latch plate 112 again re-engages with, i.e. comes back into contact with, latching surface 400 of protrusion 301 of latch release lever 103 as depicted in FIG. 10, and the rod holder is now returned to the latched and stowed position as depicted in FIG. 10 and is latched there by the operation of the latching mechanism, namely the latching surface 400 of latch release lever 103 contacting the first surface of latch plate 112 and being held there by biasing force R provided by spring 110, as hereinbefore described.

Referring again to FIGS. 10 and 11, in embodiments, latch release lever 103 may be biased into a nominal position of rotation by the biasing force R provided by compression spring 110, where the nominal position is defined as being a position that, when latch release lever latching surface 400 is in contact with the first surface 302 of latch plate 112, rod holder 101 is latched into the latched stowed position, and when the latch release lever latching surface 400 is in contact with second surface 303 of latch plate 112, the rod holder 101 is in the rod insertion/removal position. The biasing force R tends to oppose the rotating of the latch release lever in a direction of rotation that removes contact between latch release lever latching surface 400 and latch plate first surface 302 when the rod holder is in the latched and stowed position, and biasing force R tends to oppose the rotating of the latch release lever in a direction of rotation that removes contact between latch release lever latching surface 400 and latch plate second surface 303 then the rod holder is in the latched and stowed position. Both FIG. 10 and FIG. 11 depict latch release lever 103 in the nominal position.

Figure 12:
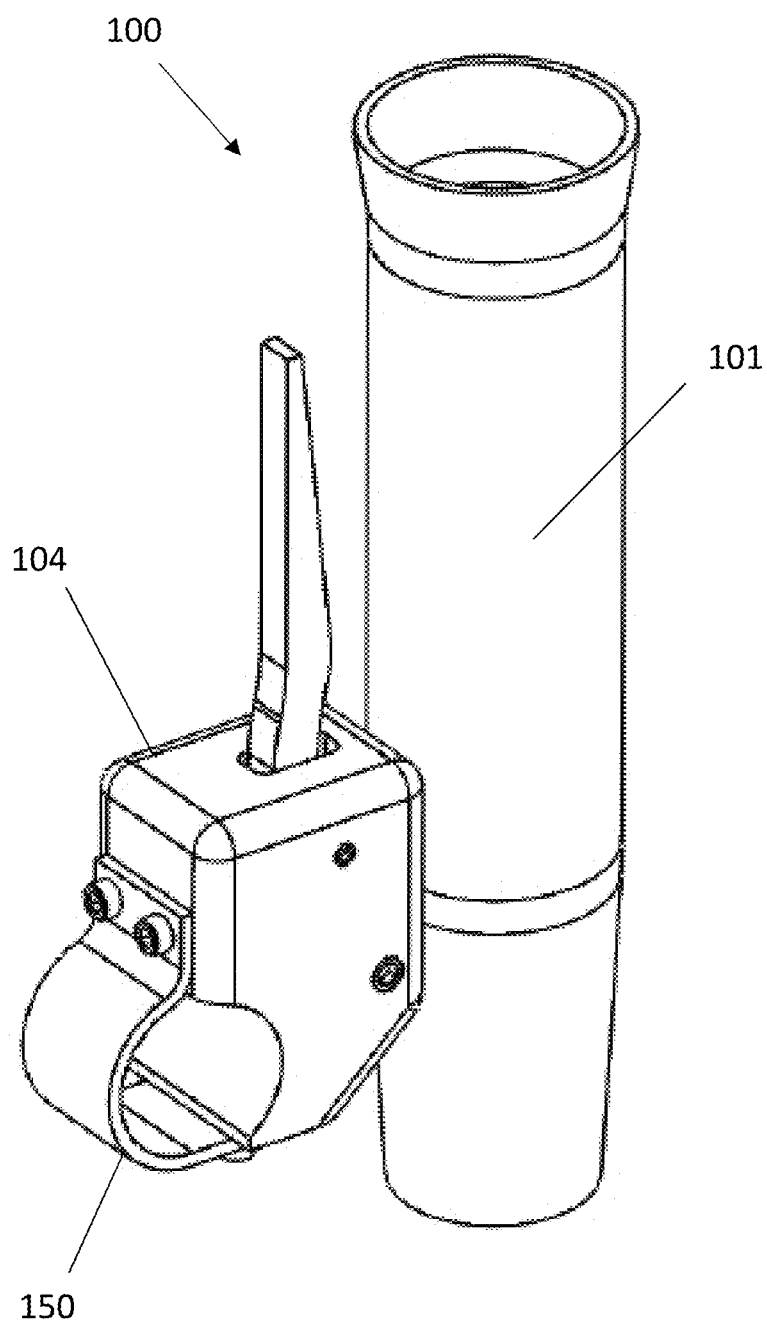
FIGS. 12 and 13 depict a clamp-on embodiment of the invention, in which the latchable rotatable rod holder may be attached to any receiving structure by operation of clamp 150.
Figure 13:
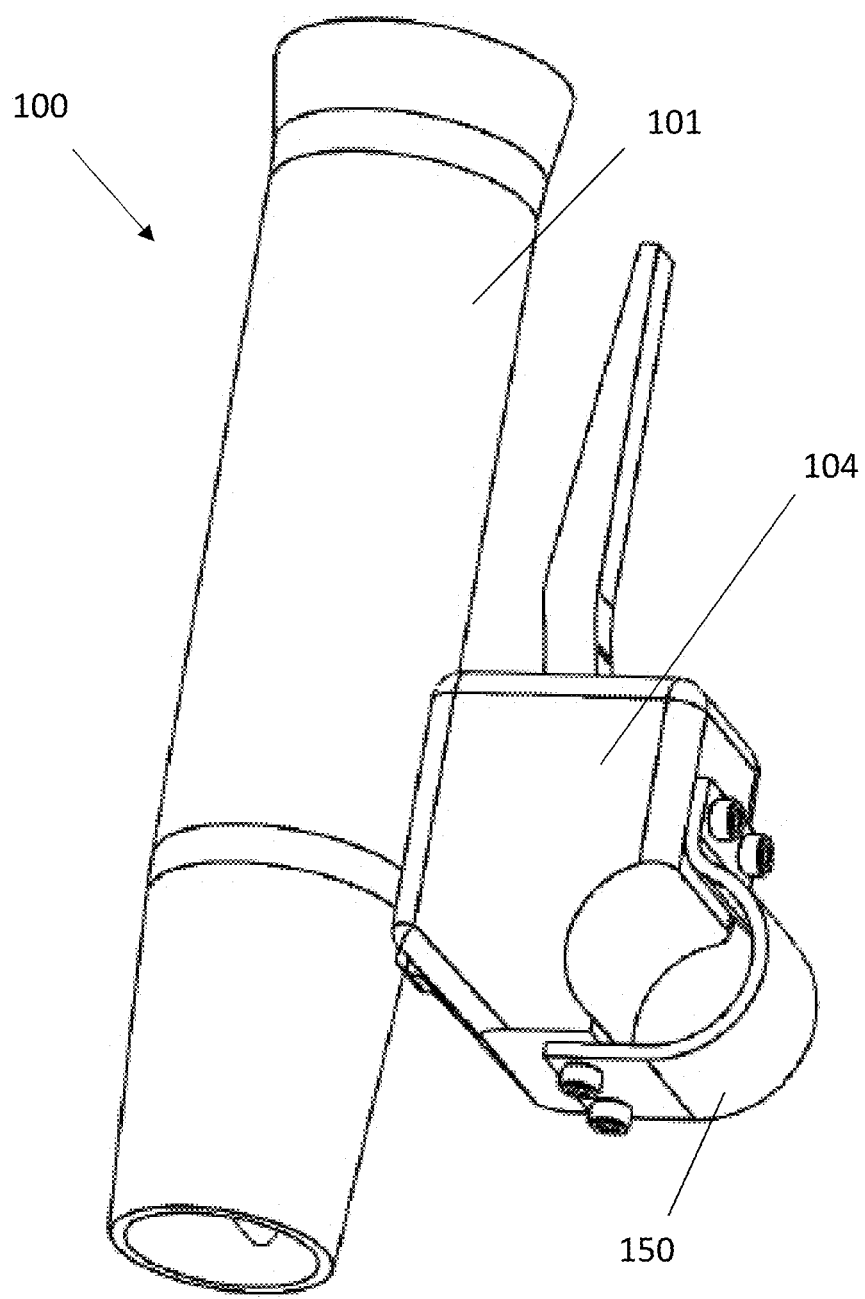
Figure 14:
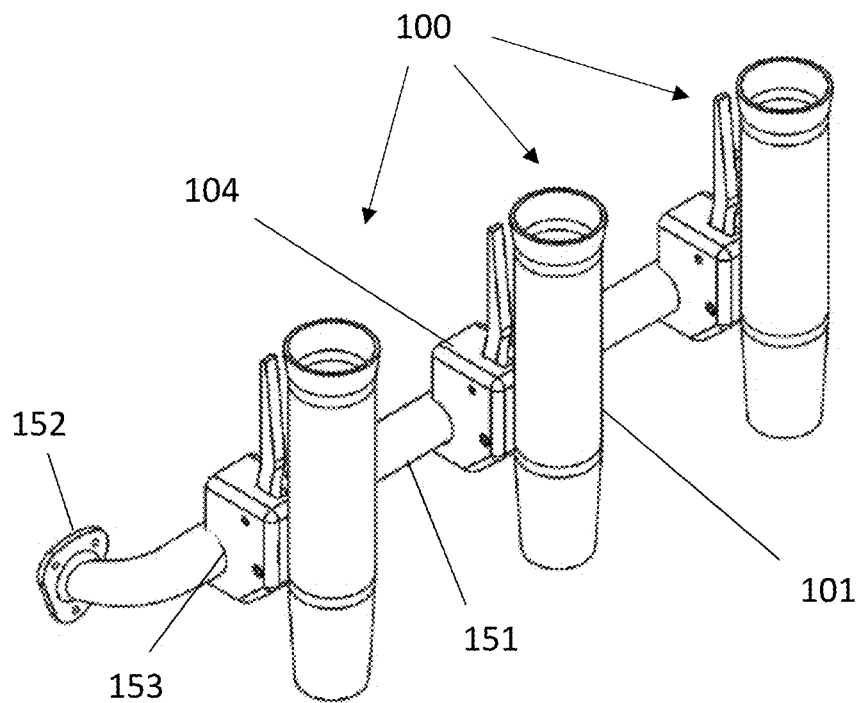
FIGS. 14-17 depict a multi-gang embodiment of the invention in which one or more latchable rotatable rod holders may be attached to a structure 151, which is then attached to a receiving structure such as the side of a boat helm station or other surface.
Figure 15:
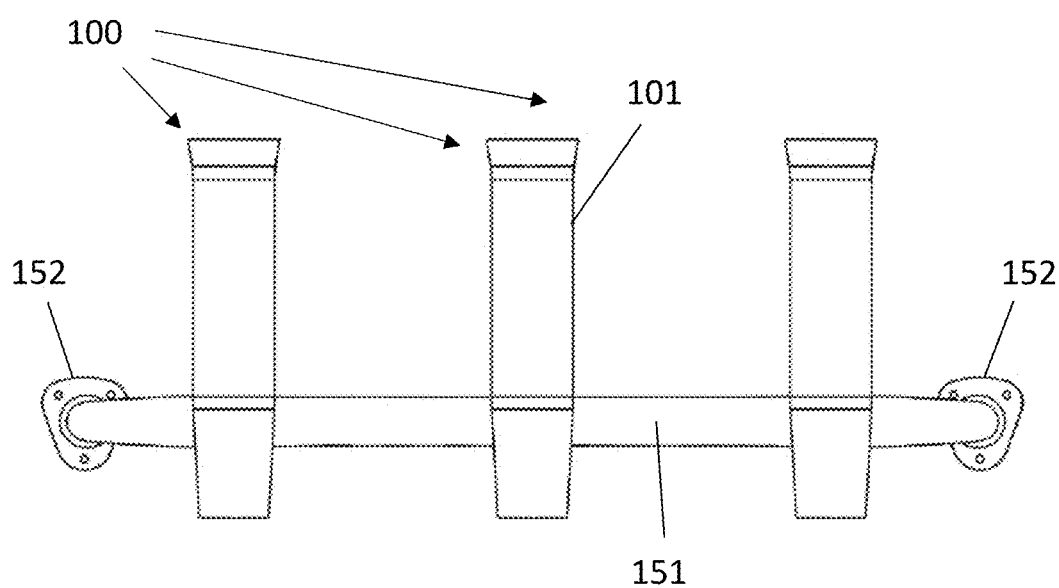
Figure 16:
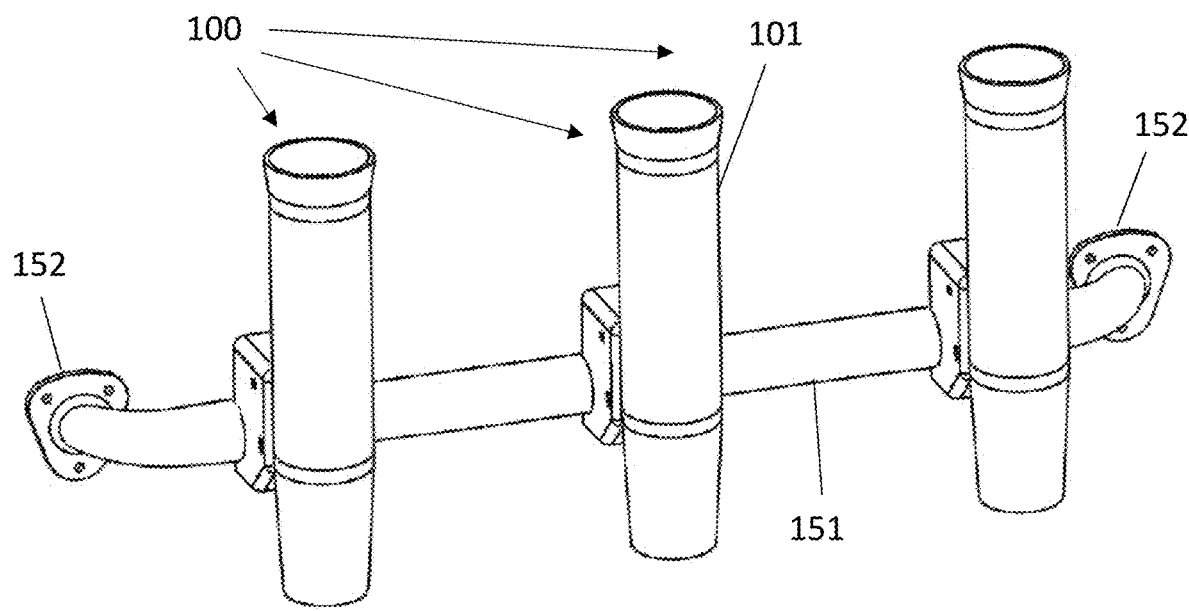
Figure 17:
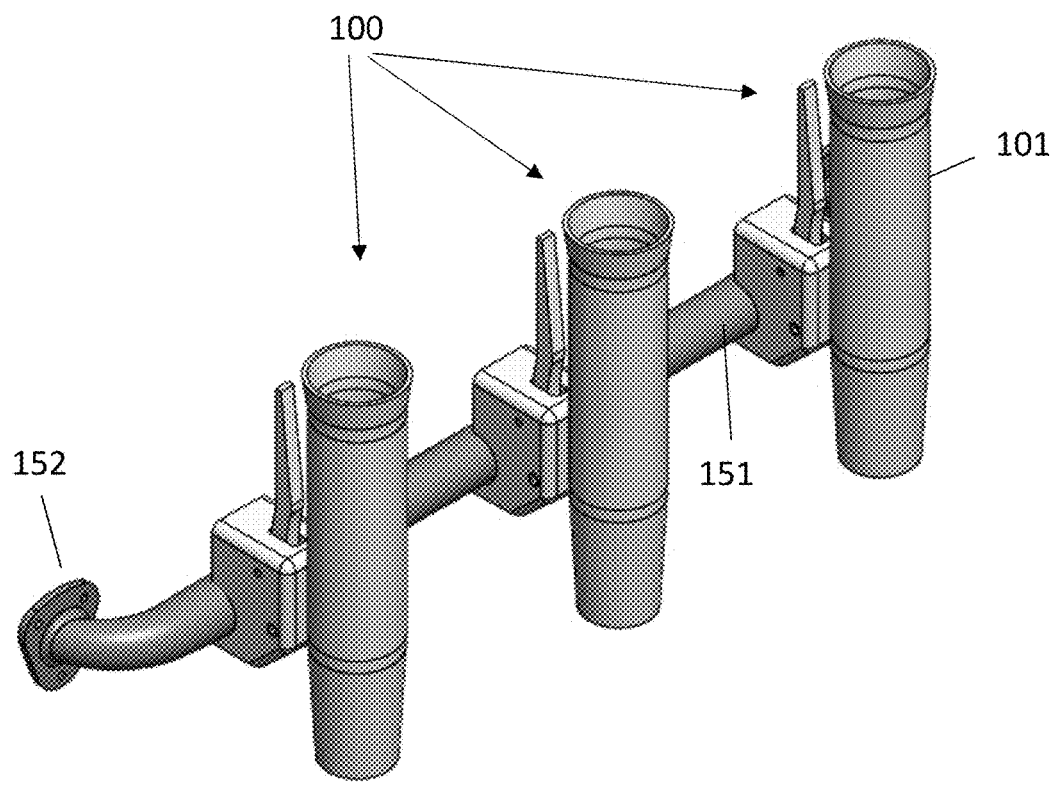

Referring now to FIGS. 12 and 13, an exemplary embodiment of a latchable rotating rod holder of the invention is depicted that is adapted to be removeably attached to a structure such as a pipe or other structure, which may, but does not necessarily comprise a circular cross section, by means of a clamp such as the one depicted as element 150. In FIGS. 12 and 13, an exemplary embodiment of a clamp that comprises threaded fasteners for tightening the clamp element 150 around the structure (an embodiment of which is depicted in FIGS. 14, 15, 16 and 17 as element 151) is depicted, however any type of clamp attachment known in the art, such as, for example, a cam-action clamp, may be used to attach the rod holder of the invention to a structure. Rod holder 101 and base 104 are identified for reference.

Referring now to FIGS. 14, 15, 16 and 17, a "multi-gang" version of the invention is depicted in which a plurality of latchable rotating rod holders 100 may be attached by either removable or permanent attachment means to a structure 151. In the examples of FIGS. 14, 15, 16 and 17, three rod holders 100 are shown, but this embodiment of the invention may comprise any number of rod holders 100. The attachment may be removable such as by using a clamp 150, which may be any type of clamp that exerts enough clamping force between a clamp element 150 of base 104 to that rod holder 100 is held securely in place when a rod is inserted into rod holder 101, or may be permanent attachment using means such as welding or chemical bonding between base 104 and structure 151 where there is contact between these elements, such as, for example, at point 153. Structure 151 may be removeably or permanently attached a surface of a receiving structure by any attachment means known in the art, such as, for example and not by way of limitation, mounting flange 152 using threaded fasteners for a removable attachment to the receiving structure. Alternatively, structure 151 may be attached to a receiving structure by permanent means such as welding or chemical bonding, or any other means known in the art. The receiving structure may be any desired structure. In an exemplary, non-limiting use case, the receiving structure may be a surface of a boat or other vehicle. Rod holders 101 and base 104 are identified for reference.

In the embodiments described and shown herein, it can be seen that latch release lever 103 comprises a "handle" portion 803 (see FIGS. 10 and 11) that may be operable by hand to rotate latch release lever latching protrusion 301. Also described and shown in the drawings is optional foot pedal 800, which may also be operable by foot to rotate latch release lever latching protrusion 301. In embodiments, both latch release lever handle portion 803 and foot pedal 800 may be present and may comprise the invention. In other embodiments, only latch release lever handle portion 803 may be present (meaning that, in such embodiments, optional foot pedal 800 does not comprise the invention). In still other embodiments only optional foot pedal 800 may be present (meaning that, in such embodiments, optional latch release lever handle portion 803 does not comprise the invention).

While specific embodiments are depicted in the figures and described in the written description of the invention, it is to be understood that the scope of the invention and the appended claims includes all legal structural equivalents. Although the components, parts and elements comprising the invention may be described in the exemplary embodiments as comprising a particular material, the scope of the invention includes all suitable materials of such strength, anti-corrosive, other physical characteristics as may be appropriate for the intended use. Such materials include but are not limited to aluminum, steel, stainless steel, other metals and metal alloys, composite materials, plastics, materials known to provide a rigid structure while providing reduced friction such as Teflon or Delrin, rubber materials, reclaimed materials, materials formed from organic compounds, and all other known materials.

What is claimed is:

1. A latchable, rotatable rod holder, comprising:
   a base;
   a latch release lever rotatably attached to said base, said latch release lever having a latching surface;
   a rod holder adapted to receive a rod, said rod having a length, said rod holder attached to said base via a rod holder rotatable attachment, said rod holder comprising a latch plate having a first surface and a second surface;
   wherein said latch release lever latching surface is adapted to contact said first surface of said latch plate when said rod holder is in a latched stowed position, such that said contact between said latch release lever latching surface and said first surface of said latch plate prevents said rod holder from rotating on said rod holder rotatable attachment, latching said rod holder into the latched stowed position;
   wherein when said latch release lever is rotated on said latch release lever rotatable attachment such that said contact between said latch release lever latching surface and said first surface of said latch plate is removed, said rod holder is allowed to rotate on said rod holder rotatable attachment in a first direction towards a rod insertion/removal position;
   wherein said rod holder rotatable attachment to said base is via said latch plate.

2. The latchable, rotatable rod holder of claim 1, wherein said rod holder is further defined as an elongate structure having a length, a lengthwise opening, and an open end, allowing an end of said rod to be inserted through said rod holder open end, and allowing said rod to be received along at least a portion of its length by said rod holder lengthwise opening.

3. The latchable, rotatable rod holder of claim 2, wherein said rod holder lengthwise opening is circular in cross section for at least a portion of said rod holder length.

4. The rotatable rod holder of claim 1, wherein, when said rod holder is rotated on said rod holder rotatable attachment in said first direction of rotation into said rod insertion/removal position, said latch release lever latching surface contacts said latch plate second surface, preventing further rotation of said rod holder in said first direction of rotation, and wherein said contact between said latch release lever latching surface and said latch plate second surface maintains said rod holder in said rod insertion/removal position until said rod holder is rotated in a direction opposite of said first direction of rotation back into the latched stowed position.

5. The rotatable rod holder of claim 1, wherein said latch release lever is biased into a nominal position of rotation by a biasing force, wherein said nominal position is defined as being a position that, when said latch release lever latching surface is in contact with said first surface, said rod holder is latched into said latched stowed position, and when said latch release lever latching surface is in contact with said second surface, said rod holder is in said rod insertion/removal position, and wherein said biasing force tends to oppose the rotating of said latch release lever in a direction of rotation that removes contact between said latch release lever latching surface and said latch plate first surface.

6. The rotatable rod holder of claim 5, wherein said biasing force is provided by a compression spring that is partially compressed and is disposed between a surface of said base and said latch release lever.

7. The rotatable rod holder of claim 6, further comprising a spherical load transferring structure disposed between said compression spring and said surface of said latch release lever.

8. The rotatable rod holder of claim 1, wherein a center of mass of said rod holder is horizontally offset from said rod holder axis of rotation, allowing the force of gravity acting on the rod holder center of mass to cause the rod holder to rotate towards the rod insertion/removal position when, from the latched stowed position, the latch release lever is rotated on said latch release lever rotatable attachment such that said contact between said latch release lever latching surface and said first surface of said latch plate is removed.

9. The rotatable rod holder of claim 1, wherein said latch plate comprises a friction reducing material between contacting surfaces of said latch release lever latching surface and said first and second surfaces.

10. The latchable, rotatable rod holder of claim 1, wherein said latch release lever is further defined as an elongate structure protruding from an upper surface of said base when said rod holder is oriented in an upward direction.

11. The latchable, rotatable rod holder of claim 1, wherein said latch release lever is further defined as a foot pedal structure protruding from a side surface of said base when said rod holder is oriented in an upward direction.

12. The latchable, rotatable rod holder of claim 9, wherein said latch release lever is further defined as comprising a foot pedal structure protruding from a side surface of said base when said rod holder is oriented in an upward direction.

13. A latchable, rotatable rod holder, comprising:
a base;
a latch release lever rotatably attached to said base, said latch release lever having a latching surface;
a rod holder adapted to receive a rod, said rod having a length, said rod holder attached to said base via a rod holder rotatable attachment, said rod holder comprising a latch plate having a first surface and a second surface;
wherein said latch release lever latching surface is adapted to contact said first surface of said latch plate when said rod holder is in a latched stowed position, such that said contact between said latch release lever latching surface and said first surface of said latch plate prevents said rod holder from rotating on said rod holder rotatable attachment, latching said rod holder into the latched stowed position; and
wherein when said latch release lever is rotated on said latch release lever rotatable attachment such that said contact between said latch release lever latching surface and said first surface of said latch plate is removed, said rod holder is allowed to rotate on said rod holder rotatable attachment towards a rod insertion/removal position;
wherein said rod holder is further defined as an elongate structure having a length, a lengthwise opening, and an open end, allowing an end of said rod to be inserted through said rod holder open end, and allowing said rod to be received along at least a portion of its length by said rod holder lengthwise opening;
wherein, when said rod holder is rotated on said rod holder rotatable attachment in a first direction of rotation into said rod insertion/removal position, said latch release lever latching surface contacts said latch plate second surface, preventing further rotation of said rod holder in said first direction of rotation, and wherein said contact between said latch release lever latching surface and said latch plate second surface maintains said rod holder in said rod insertion/removal position until said rod holder is rotated in a direction opposite of said first direction of rotation back into the latched stowed position;
wherein said latch release lever is biased into a nominal position of rotation by a biasing force, wherein said nominal position is defined as being a position that, when said latch release lever latching surface is in contact with said first surface, said rod holder is latched into said latched stowed position, and when said latch release lever latching surface is in contact with said second surface, said rod holder is in said rod insertion/removal position, and wherein said biasing force tends to oppose the rotating of said latch release lever in a direction of rotation that removes contact between said latch release lever latching surface and said latch plate first surface;
wherein a center of mass of said rod holder is horizontally offset from said rod holder axis of rotation, allowing the force of gravity acting on the rod holder center of mass to cause the rod holder to rotate towards the rod insertion/removal position when, from the latched stowed position, the latch release lever is rotated on said latch release lever rotatable attachment such that said contact between said latch release lever latching surface and said first surface of said latch plate is removed;
wherein said biasing force is provided by a compression spring that is at least partially compressed and is disposed between a surface of said base and said latch release lever.

14. The latchable, rotatable rod holder of claim 13, wherein said rod holder lengthwise opening is circular in cross section.

15. The latchable, rotatable rod holder of claim 13, wherein said latch release lever is further defined as an elongate structure protruding from an upper surface of said base when said rod holder is oriented in an upward direction.

16. The latchable, rotatable rod holder of claim 13, wherein said latch release lever is further defined as a foot pedal structure protruding from a side surface of said base when said rod holder is oriented in an upward direction.

17. The latchable, rotatable rod holder of claim 15, wherein said latch release lever is further defined as comprising a foot pedal structure protruding from a side surface of said base when said rod holder is oriented in an upward direction.

* * * * *